US012192780B2

(12) United States Patent
Litjens et al.

(10) Patent No.: US 12,192,780 B2
(45) Date of Patent: Jan. 7, 2025

(54) ENHANCED NETWORK AVAILABILITY FOR PRIVATE ENTERPRISE NETWORKS IN SHARED SPECTRUM SYSTEMS

(71) Applicant: Nokia Solutions and Networks Oy, Espoo (FI)

(72) Inventors: Stephan Litjens, Helsinki (FI); Mohammad Riaz Khawer, Murray Hill, NJ (US); Milind M. Buddhikot, Murray Hill, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 343 days.

(21) Appl. No.: 17/596,759

(22) PCT Filed: Jun. 18, 2019

(86) PCT No.: PCT/US2019/037745
§ 371 (c)(1),
(2) Date: Dec. 17, 2021

(87) PCT Pub. No.: WO2020/256706
PCT Pub. Date: Dec. 24, 2020

(65) Prior Publication Data
US 2022/0303782 A1    Sep. 22, 2022

(51) Int. Cl.
*H04W 16/14* (2009.01)
*H04W 24/02* (2009.01)
*H04W 84/04* (2009.01)

(52) U.S. Cl.
CPC .......... *H04W 16/14* (2013.01); *H04W 24/02* (2013.01); *H04W 84/045* (2013.01)

(58) Field of Classification Search
CPC ... H04W 16/14; H04W 24/02; H04W 84/045; H04W 84/08
See application file for complete search history.

(56) References Cited

U.S. PATENT DOCUMENTS

2019/0357155 A1* 11/2019 Al-Mufti ............ H04W 52/243
2019/0387414 A1* 12/2019 MacMullan ........ H04L 43/0829
(Continued)

FOREIGN PATENT DOCUMENTS

| CN | 113170310 A | 7/2021 | |
| WO | WO-2017186294 A1 * | 11/2017 | ............ H04W 16/14 |

OTHER PUBLICATIONS

Marko Palola et al. "Field Trial of the 3.5 GHz Citizens Broadband Radio Service Governed by a Spectrum Access System (SAS)", 2017 IEEE International Symposium on Dynamic Spectrum Access Networks (DySPAN) (Year: 2017).*
(Continued)

*Primary Examiner* — Ayaz R Sheikh
*Assistant Examiner* — Mang Boi Thawng
(74) *Attorney, Agent, or Firm* — Tong, Rea, Bentley & Kim, LLC

(57) ABSTRACT

An apparatus such as a domain proxy implemented in an edge cloud of a private enterprise network includes a processor configured to aggregate traffic for Citizens Broadband radio Service Devices (CBSDs) in a private enterprise network. The apparatus also includes a transceiver configured to monitor communication with geo-redundant instances of a spectrum access system (SAS) that allocate frequency bands in a shared spectrum to the CBSDs. The processor is configured to instantiate a local SAS in response to the geo-redundant instances of the SAS becoming unavailable. The local SAS is configured to respond to heartbeat messages from the CBSDs. The local SAS is also configured to attempt to establish a connection with an environmental sensing capability (ESC) in response to the geo-redundant SASs becoming unavailable.

20 Claims, 11 Drawing Sheets

(56) References Cited

U.S. PATENT DOCUMENTS

2020/0267563 A1* 8/2020 Sevindik ............... H04W 16/14
2020/0305159 A1* 9/2020 Raghothaman ... H04W 72/0453
2021/0127346 A1* 4/2021 Hmimy ................ H04W 12/06

OTHER PUBLICATIONS

International Search Report and Written Opinion received for corresponding Patent Cooperation Treaty Application No. PCT/US2019/037745, dated Mar. 2, 2020, 14 pages.

Palola et el., "Field trial of the 3.5 GHz citizens broadband radio service governed by a spectrum access system (SAS)", IEEE International Symposium on Dynamic Spectrum Access Networks (DySPAN), Mar. 6-9, 2017, 9 pages.

Ying et al., "SAS-Assisted Coexistence-Aware Dynamic Channel Assignment in CBRS Band", IEEE Transactions on Wireless Communications, vol. 17, No. 9, Sep. 2018, pp. 6307-6320.

"Test and Certification for Citizens Broadband Radio Service (CBRS); Conformance and Performance Test Technical Specification; SAS as Unit Under Test (UUT)", Wireless Innovation Forum, Document WINNF-TS-0061, Version 1.0.0, Nov. 29, 2017, 119 pages.

Chinese Office Action and Search Report, Application No. 201980099466.2, dated Jul. 15, 2024; pp. 9.

* cited by examiner

ENHANCED NETWORK AVAILABILITY FOR PRIVATE ENTERPRISE NETWORKS IN SHARED SPECTRUM SYSTEMS

RELATED APPLICATION

This application was originally filed as PCT Application No. PCT/US2019/037745, filed on Jun. 18, 2019, each of which is incorporated herein by reference in its entirety.

BACKGROUND

Spectrum is the most precious commodity in deploying wireless networks such as a private enterprise network. Cellular communication systems, such as networks that provide wireless connectivity using Long Term Evolution (LTE) or Fifth Generation (5G) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. The apparatus includes a processor configured to aggregate traffic for Citizens Broadband radio Service Devices (CBSDs) in a private enterprise network. The apparatus also includes a transceiver configured to monitor communication with geo-redundant instances of a spectrum access system (SAS) that allocate frequency bands in a shared spectrum to the CBSDs. The processor is configured to instantiate a local SAS in response to the geo-redundant instances of the SAS becoming unavailable and the local SAS is configured to respond to heartbeat messages from the CBSDs.

In some embodiments, the local SAS is configured to provide information indicating valid channels in response to spectrum inquiry messages received from the CBSDs and approve grant requests from the CBSDs for channels in a valid channel set.

In some embodiments, the local SAS is configured to attempt to establish a connection with an environmental sensing capability (ESC) in response to the geo-redundant SASs becoming unavailable.

In some embodiments, the local SAS determines whether the connection with the ESC has been established and whether a first geographic area and a first channel in the shared spectrum served by the CBSDs overlaps with a dynamic protection area (DPA) defined by a second geographic area and a portion of the shared spectrum allocated to an incumbent.

In some embodiments, the local SAS is configured to instruct the CBSDs to switch to a second channel if the connection was not established with the ESC and if the first geographic area and the first channel overlap with the DPA.

In some embodiments, the second channel is computed by at least one of the geo-redundant instances of the SAS based on presence information for the CBSDs and other CBSDs that are managed by other SAS vendors proximate the first geographic area.

In some embodiments, the second channel is spatially separated from the first channel by a frequency determined based on properties of the incumbent.

In some embodiments, the local SAS transmits a heartbeat response to the CBSDs that de-authorizes a grant of the first channel in response to determining that the connection with the ESC was established and in response to the ESC reporting presence of the incumbent on the first channel.

In some embodiments, the local SAS grants the CBSDs access to a second channel in response to receiving a message indicating the second channel following transmission of the heartbeat message that de-authorizes the grant of the first channel. In some embodiments, the local SAS grants the CBSDs access to the second channel in response to the second channel being previously provided to the local SAS by at least one of the geo-redundant instances of the SAS.

In some embodiments, the local SAS is configured to respond to the heartbeat messages from the CBSDs for a time interval that is determined based on a predetermined time interval for exchanging status information between peer instances of the SAS.

In some embodiments, the geo-redundant instances of the SAS determine channel and power assignments for the CBSDs based on the status information and the channel and power assignments are valid for the predetermined time interval.

In some embodiments, the local SAS receives the status information from at least one of the geo-redundant instances of the SAS, and the local SAS receives information indicating the second channel and login credentials for the ESC.

In some embodiments, a method is provided. The method includes aggregating, at a domain proxy, traffic for Citizens Broadband radio Service Devices (CBSDs) in a private enterprise network. The method also includes monitoring, at the domain proxy, communication with geo-redundant instances of a spectrum access system (SAS) that allocate frequency bands in a shared spectrum to the CBSDs. The method also includes instantiating, at the domain proxy, a local SAS in response to the geo-redundant instances of the SAS becoming unavailable. The method further includes responding, from the local SAS, to heartbeat messages from the CBSDs.

In some embodiments, responding to the heartbeat messages includes providing information indicating valid channels in response to spectrum inquiry messages received from the CBSDs.

In some embodiments, responding to the heartbeat messages includes approving grant requests from the CBSDs for channels in a valid channel set.

Some embodiments of the method include attempting to establish a connection between the local SAS and an environmental sensing capability (ESC) in response to the geo-redundant SASs becoming unavailable.

Some embodiments of the method include determining, at the local SAS, whether the connection with the ESC has been established and whether a first geographic area and a first channel in the shared spectrum served by the CBSDs overlaps with a dynamic protection area (DPA) defined by a second geographic area and a portion of the shared spectrum allocated to an incumbent.

Some embodiments of the method include instructing, at the local SAS, the CBSDs to switch to a second channel if the connection was not established with the ESC and if the first geographic area and the first channel overlap with the DPA.

In some embodiments, the second channel is computed by at least one of the geo-redundant instances of the SAS based on presence information for the CBSDs and other CBSDs that are managed by other SAS vendors proximate the first geographic area.

In some embodiments, the second channel is spatially separated from the first channel by a frequency determined based on properties of the incumbent.

Some embodiments of the method include transmitting, from the local SAS, a heartbeat response to the CBSDs that de-authorizes a grant of the first channel in response to determining that the connection with the ESC was established and in response to the ESC reporting presence of an incumbent on the first channel.

Some embodiments of the method include granting, at the local SAS, the CBSDs access to a second channel in response to receiving a message indicating the second channel following transmission of the heartbeat message that de-authorizes the grant of the first channel and in response to the second channel being previously provided to the local SAS by at least one of the geo-redundant instances of the SAS.

Some embodiments of the method include responding, from the local SAS, to the heartbeat messages from the CBSDs for a time interval that is determined based on a predetermined time interval for exchanging status information between peer instances of the SAS.

In some embodiments, the geo-redundant instances of the SAS determine channel and power assignments for the CBSDs based on the status information, and the channel and power assignments are valid for the predetermined time interval.

Some embodiments of the method include receiving, at the local SAS, the status information from at least one of the geo-redundant instances of the SAS and receiving, at the local SAS, information indicating the second channel and login credentials for the ESC.

In some embodiments an apparatus is provided. The apparatus includes at least one processor and at least one memory including computer program code. The at least one memory and the computer program code are configured to, with the at least one processor, cause the apparatus at least to perform aggregating traffic for Citizens Broadband radio Service Devices (CBSDs) in a private enterprise network, monitoring communication with geo-redundant instances of a spectrum access system (SAS) that allocate frequency bands in a shared spectrum to the CBSDs, instantiating a local SAS in response to the geo-redundant instances of the SAS becoming unavailable, and responding to heartbeat messages from the CBSDs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
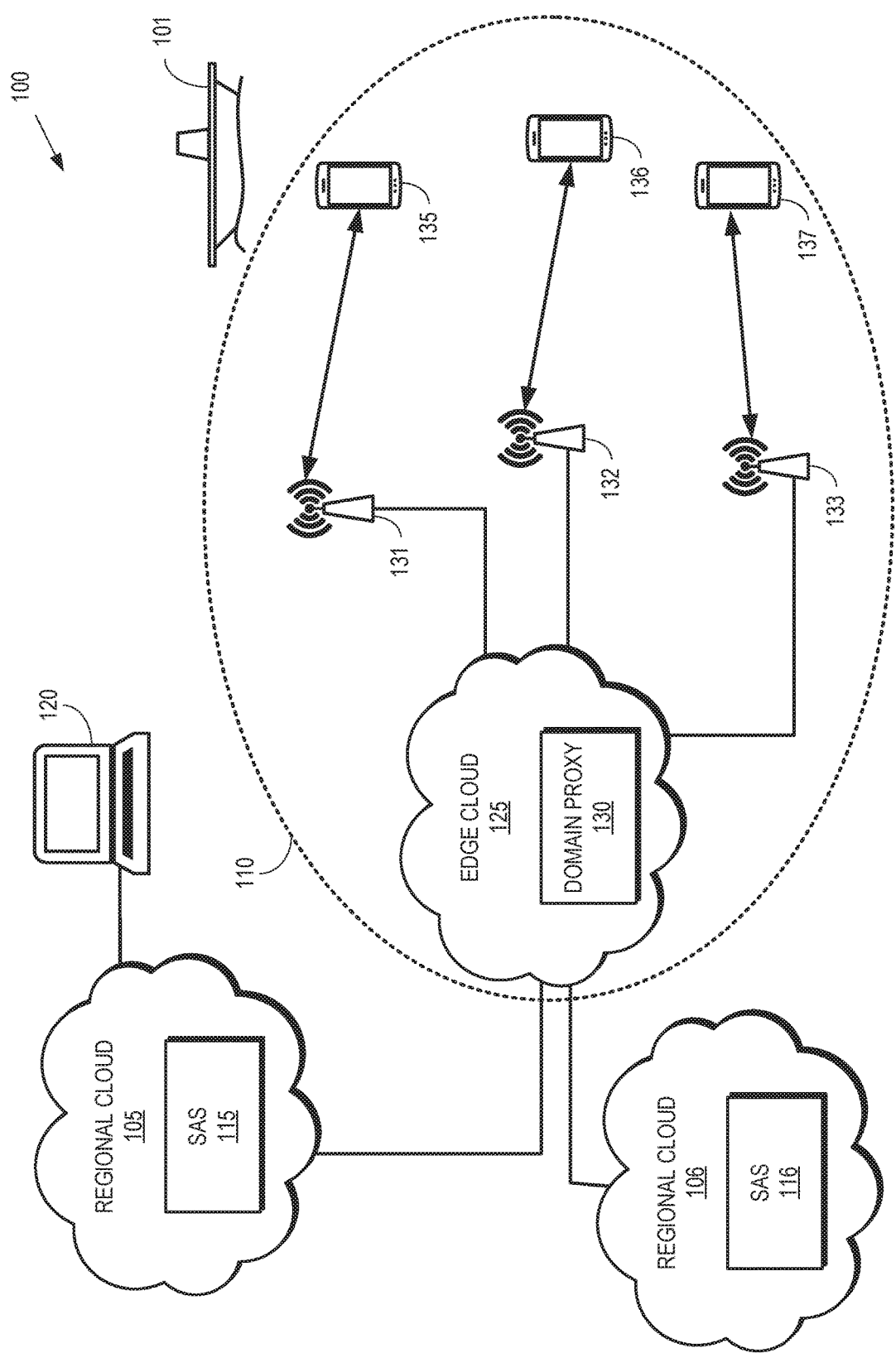
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Broadband radio Service Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The frequency bands are allocated to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographical area, the incumbent is granted exclusive access to a portion of the CBRS spectrum. For example, if a Navy ship enters a port, communication systems on the ship are granted exclusive access to frequencies that may impact up to 20 MHz within the lower 100 MHz of the CBRS 3550-3700 MHz band. Operators that have received a PAL and GAA operators are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

Each CBSD that provides wireless connectivity in the CBRS spectrum must be under direct control of an SAS. The CBSDs therefore register with an SAS to begin providing wireless connectivity. The status of the CBSDs is monitored using heartbeat messages exchanged between a registered CBSD and its controlling SAS. The heartbeat messages are exchanged at predetermined time intervals (e.g., 20 seconds, 30 seconds, 60 seconds, and the like) and registration of the CBSD with the SAS is maintained as long as at least one heartbeat message is successfully received within a timeout interval such as 240 seconds or 300 seconds or other timeout interval. A break in the heartbeat messages for more than the timeout interval causes the CBSD to stop their transmissions on the channel granted by the SAS in the CBRS band and thus incur a service downtime that is not acceptable for commercial deployment. In some case, a CBSD (or a domain proxy, DP, that aggregates messages for multiple CBSDs) detects break in the heartbeat messages due to network connectivity issues even though the controlling SAS is functional and continuing to transmit heartbeat messages. The network connectivity issues can include a disruption or degradation of bandwidth associated with an SAS interface network port, backhaul connectivity between the edge cloud infrastructure and an SAS regional cloud, and the like. Service downtime due to a break and network connectivity between a CBSD or DP and the corresponding instance of an SAS is not acceptable for commercial deployments.

One approach to providing high-availability is to implement geo-redundancy, e.g., by associating each CBSD with a primary SAS in one location and a secondary SAS in another location. If the primary SAS goes down, the CBSDs connect to the secondary SAS and resume CBRS band operation. Switching between the primary SAS and the secondary SAS requires that the CBSD stop its current CBRS band operation on the channel granted by the primary SAS to comply with CBRS band rules established by the FCC. The CBRS then transmits a registration request to the secondary SAS to acquire a new channel in the shared spectrum for providing wireless connectivity. The secondary SAS allocates the channel to the CBSD by transmitting a grant message. Implementing geo-redundant SASs (perhaps in combination with techniques to reduce the switching time between the geo-redundant SASs) significantly increases the availability of an SAS to the CBSDs.

However, geo-redundant SASs are vulnerable to other failure modes such as interruption of all the backhaul links to the geo-redundant SASs (e.g., due to a natural disaster) or distributed denial of service (DDOS) attacks that render all the geo-redundant SASs unresponsive. If the geo-redundant SASs remain unresponsive for more than 240 seconds, the CBSDs are required to turn off their transmitters in compliance with the shared spectrum operating rules mandated by the FCC to protect incumbents. Private enterprise networks, particularly those that do not have other connectivity options, can therefore be disrupted indefinitely by the backhaul failure or DDOS attack. Disrupting a private enterprise network by rendering all the geo-redundant SASs unresponsive can interrupt mission critical applications. For example, disrupting the private enterprise network implemented in an energy utility can interrupt the energy supply to an entire community if the disruption lasts longer than 240 seconds.

FIGS. 1-11 disclose embodiments of techniques for maintaining service continuity for Citizens Broadband radio Service Devices (CBSDs) in a private enterprise network despite the unavailability of geo-redundant instances of a spectrum access system (SAS) by aggregating traffic for the CBSDs at a domain proxy that implements a local SAS. In response to detecting unavailability of the geo-redundant SASs, the local SAS is configured to respond to heartbeat requests received from the CBSDs. Some embodiments of the local SAS are also configured to provide information indicating valid channels in response to a spectrum inquiry message received from the CBSD and approve grant requests for channels in a valid channel set.

The local SAS also attempts to establish a connection with an environmental sensing capability (ESC) in response to the geo-redundant SASs becoming unavailable. If the connection cannot be established with the ESC, and if the geographic area and spectrum served by the CBSDs overlaps with a dynamic protection area (DPA) defined by a geographic area and a portion of spectrum allocated to an incumbent, the local SAS forces or instructs the CBSDs to switch to a backup channel if the previously granted channels are in a first portion of the Citizens Broadband Radio Service (CBRS) spectrum, e.g., the lower 100 MHz. The backup channel is computed by the primary or secondary SAS considering the presence of other CBSDs that are managed by other vendor SAS's in the same geographic area. The backup channel is either in the upper 50 MHz or the lower 100 MHz of the CBRS band. If the backup channel is in the lower 100 MHz within a DPA, the primary or secondary SAS selects a backup channel that is spatially separated from the originally granted channel by more than 20 MHz (naval radar systems typically impact up to 20 MHz of lower 100 MHz of the CBRS band). If the connection with the ESC is established, and if the ESC reports presence of an incumbent on a channel previously granted to the CBSDs, the local SAS transmits a heartbeat response to the CBSDs that de-authorizes the grant of the channel. Some embodiments of the CBSDs respond with a message including a backup channel. The local SAS grants the backup channel to the CBSDs if the backup channel was previously provided to the local SAS by one of the geo-redundant SASs. The local SAS continues to authorize the channel granted to the CBSDs if the channel does not overlap with the incumbent channel.

The local SAS allows the CBSDs to continue to operate when the geo-redundant SASs are unavailable, e.g., due to a backhaul failure or DDOS attack. In some embodiments, the local SAS supports operation of the CBSDs for a time interval that is determined based on a predetermined time interval for exchanging status information between peer SASs. For example, the SAS instances for different vendors are connected in a mesh configuration to exchange status information for their local CBSDs over SAS-to-SAS interfaces. This information is used to determine channel and power assignments for the CBSDs that are managed by the SAS instances and is exchanged at predetermined time interval such as every 24 hours. The configuration of the CBSDs that is determined based on the exchanged information is valid for the predetermined time interval. The geo-redundant SASs provide the status information to the local SAS so that the status information stored on the local SAS remains valid up to 24 hours after a failure that disrupts the geo-redundant SASs. The geo-redundant SASs also provide backup channel information to the local SAS and the login credentials for the ESC. Thus, the local SAS has the information needed to respond to heartbeat messages from the CBSDs in the absence of the geo-redundant SASs, even if an incumbent appears and impacts the current channel grant. In some embodiments, the local SAS can extend the valid time interval for the status information beyond the predetermined time interval, e.g., for more than 24 hours. For example, a local SAS for CBSDs that serve an inland region that does not overlap with a geographic area served by any other SAS instances, and also not impacted by the presence of any incumbents can use the status information to support the CBSDs indefinitely or until the connectivity issue with the geo-redundant SAS instances on the regional cloud is resolved.

Some embodiments of the domain proxy contain an out of band signaling mechanism (e.g. with a dialup or satellite connection) to receive Presidential Notification e.g., in case of a war, to cease operation in the CBRS band. This out of band signaling mechanism allows the private enterprise network on the edge cloud to comply with the presidential order and cease operation even though it may not be connected to the geo-redundant primary/secondary SAS instances that may have been rendered unresponsive due to e.g. DDOS attack.

Some embodiments of the geo-redundant SAS instances compute additional information (such as the backup channel) every time a new CBSD from the edge cloud private enterprise network registers itself with the regional geo-redundant SAS instances and requests a channel grant, which is downloaded to the local SAS together with status information for an incumbent and other CBSDs that are managed by other SAS vendors in the immediate geographic vicinity of the edge cloud private enterprise network. The domain proxy is configured to monitor the connection with the geo-redundant SAS instances then seamlessly switch operation to the local SAS in response to determining that connections to the geo-redundant SAS instances have been lost. As discussed herein, the local SAS proxy assumes responsibility for responding to CBSD requests within the edge cloud to keep the private enterprise network operational. Consequently, embodiments of the techniques disclosed herein extend the operational window for the CBSDs in the event of a connectivity failure with the regional geo-redundant SAS instances from just 4 minutes to up to 24 hours. This additional time provide operators with more opportunity to resolve the root cause of the problem and resume connectivity between the domain proxy on the edge cloud and the geo-redundant SAS instances on regional clouds. If the edge cloud enterprise network happens to be located within a DPA, and if the domain proxy is unable to establish a connection with the ESC to receive incumbent information within the DPA after losing connectivity with the geo redundant SASs, the local SAS on the domain proxy ensures that the CBSDs use a channel in the upper 50 MHz of the CBRS band (if the regional SAS has computed that channel as a backup channel for the CBSDs). However, if no backup channel in the upper 50 MHz channel is found, the local SAS that is also DPA enabled SAS instance on the domain proxy performs operations assuming that the DPA is enabled for the entire lower 100 MHz in the absence of an ESC sensor. In that case, the transmission power for the Category-A (indoor) and Category-B (outdoor) CBSDs may be configured based on parameters such as the antenna height, tilt, distance from the coastline and ESC sensors to keep the CBRS network operational while complying with the incumbent protection rules within the DPA.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS 115 to allocate frequency bands to operators, e.g., to the private enterprise network 110 for CBRS within the 3550-3700 MHz band. The communication system 100 also includes another regional cloud 106 that includes an SAS 116. In the illustrated embodiment, the regional clouds 105, 106 are located at different geographic locations and are therefore used to provide geo-redundancy. The SAS 116 is therefore referred to as a geo-redundant SAS 116 in some cases. The geo-redundant instances of the SAS 115, 116 communicate with each other over an SAS-SAS interface (not shown in FIG. 1 of the interest of clarity). For example, the geo-redundant instances of the SAS 115, 116 exchange status information at a determined time interval such as once every 24 hours. Other SAS-SAS interfaces (not shown in FIG. 1 in the interest of clarity) are also used to exchange status information with other SAS instances associated with other vendors at the predetermined time interval. Some embodiments of the communication system 100 include additional regional clouds and SAS instances, which may or may not be geo-redundant and communicate over corresponding SAS-SAS interfaces. The SASs 115, 116 can serve multiple private enterprise networks, although a single private enterprise network 110 is shown in FIG. 1 in the interest of clarity. Operation of the SASs 115, 116 is disclosed in more detail below.

The regional clouds 105, 106 are configured via user interface portals to one or more external computers 120, only one shown in FIG. 1 in the interest of clarity. For example, the external computer 120 provides a customer user interface portal for service management, a digital automation cloud management user interface portal, and an SAS user interface portal that is used to configure the SASs 115, 116.

The private enterprise network 110 includes an edge cloud 125 that communicates with the regional clouds 105, 106 to support a plug-and-play deployment of the private enterprise network 110. Some embodiments of the edge cloud 125 support auto configuration and self-service, industrial protocols, local connectivity with low latency, LTE/5G based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), category B CBSD (outdoor), or customer premises equipment (CPE). The CBSDs 131, 132, 133 are therefore referred to herein as the base stations 131, 132, 133 and collectively as "the base stations 131-133." Some embodiments of the domain proxy 130 are implemented in the regional clouds 105, 106.

The domain proxy 130 mediates between the SASs 115, 116 and the base stations 131-133. In order to utilize the shared spectrum, the base stations 131-133 transmit requests towards one of the SASs 115, 116 to request allocation of a portion of a frequency band. As discussed herein, the domain proxy 130 identifies one of the SASs 115, 116 as a primary SAS that is initially used to support communication in the shared spectrum and the other one of the SASs 115, 116 as a secondary SAS, which is used as a fallback in case of a disruption of service to the primary SAS. The requests include information identifying the portion of the frequency band such as one or more channels, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SASs 115, 116 by aggregating requests from multiple base stations 131-133 into a smaller number of messages that are transmitted from the domain proxy 130 to the SASs 115, 116. The base stations 131-133 provide wireless connectivity to corresponding user equipment 135, 136, 137 (collectively referred to herein as "the user equipment 135-137") in response to the SAS 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS 115 based on the policy, e.g., by comparing information in the policy to information in one or more mandatory fields of the request. The domain proxy 130 selectively provides the requests to the SASs 115, 116 depending on whether the base station 131-133 is permitted to access the SASs 115, 116. If so, the request is transmitted to the SASs 115, 116 or aggregated with other requests for transmission to the SASs 115, 116. Otherwise, the request is rejected.

The domain proxy 130 monitors connections with the geo-redundant SASs 115, 116 to determine whether the instances are available. As discussed herein, the geo-redundant SASs 115, 116 can become unavailable due to a failure in a backhaul, a natural disaster, a DDOS attack, or other scenarios. The domain proxy 130 is therefore able to instantiate a local SAS that supports the base stations 131-133 when the geo-redundant SASs are unavailable. In response to detecting unavailability of the geo-redundant SASs 115, 116, the local SAS is configured to respond to heartbeat requests received from the base stations 131-133. Some embodiments of the local SAS are also configured to provide information indicating valid channels in response to a spectrum inquiry message received from the base stations 131-133 and approve grant requests for channels in a valid channel set. The local SAS also attempts to establish a connection with an environmental sensing capability (ESC, not shown in FIG. 1 in the interest of clarity) in response to the geo-redundant SASs 115, 116 becoming unavailable. The actions of the local SAS depend upon the frequency channels allocated to (or requested by) the base stations 131-133, the presence or absence of an incumbent, and whether the local SAS is able to establish the connection with the ESC, as discussed in detail below.

Figure 2:
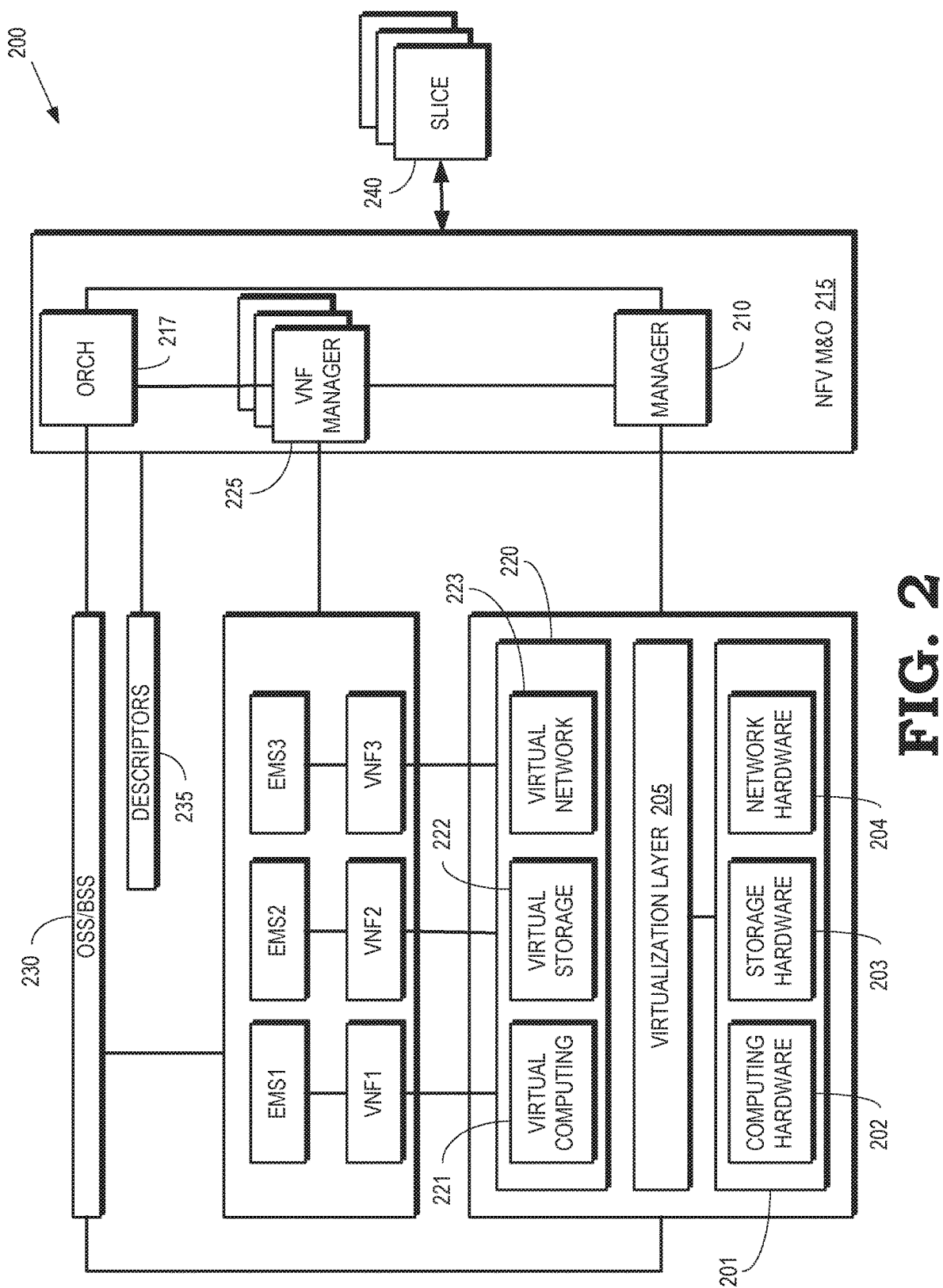
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. For example, the NFV architecture 200 provides the physical resources used to implement the domain proxy 130 shown in FIG. 1, as well as the physical resources used to instantiate the local SAS and other instances of the SAS 115, 116. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions. A network slice 240 is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
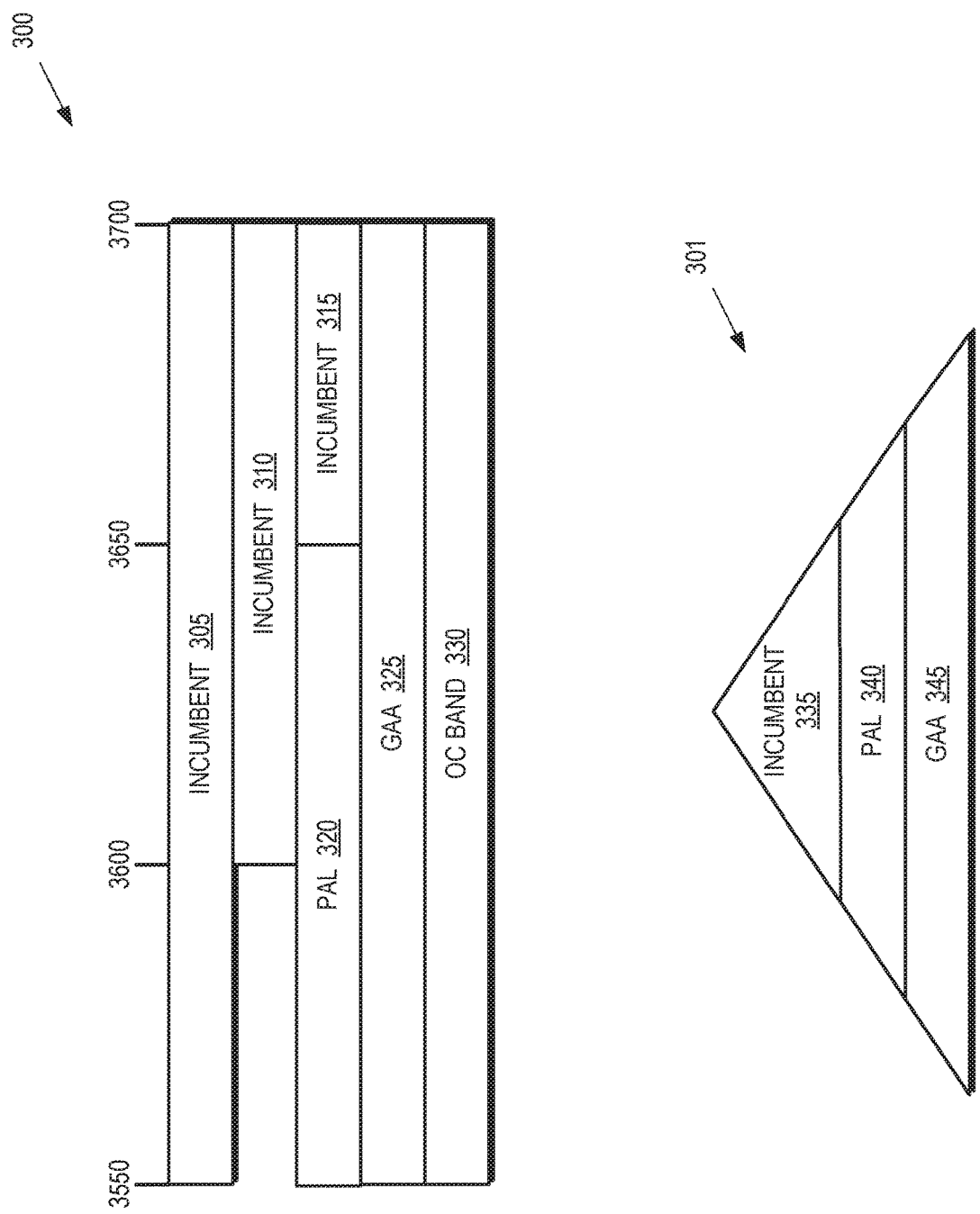
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SASs 115, 116 shown in FIG. 1 allocates portions of the frequency band to devices for providing wireless connectivity within a geographic area. For example, the SAS can allocate 20-40 MHz portions of the frequency band to different devices for use as communication channels.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

Figure 4:
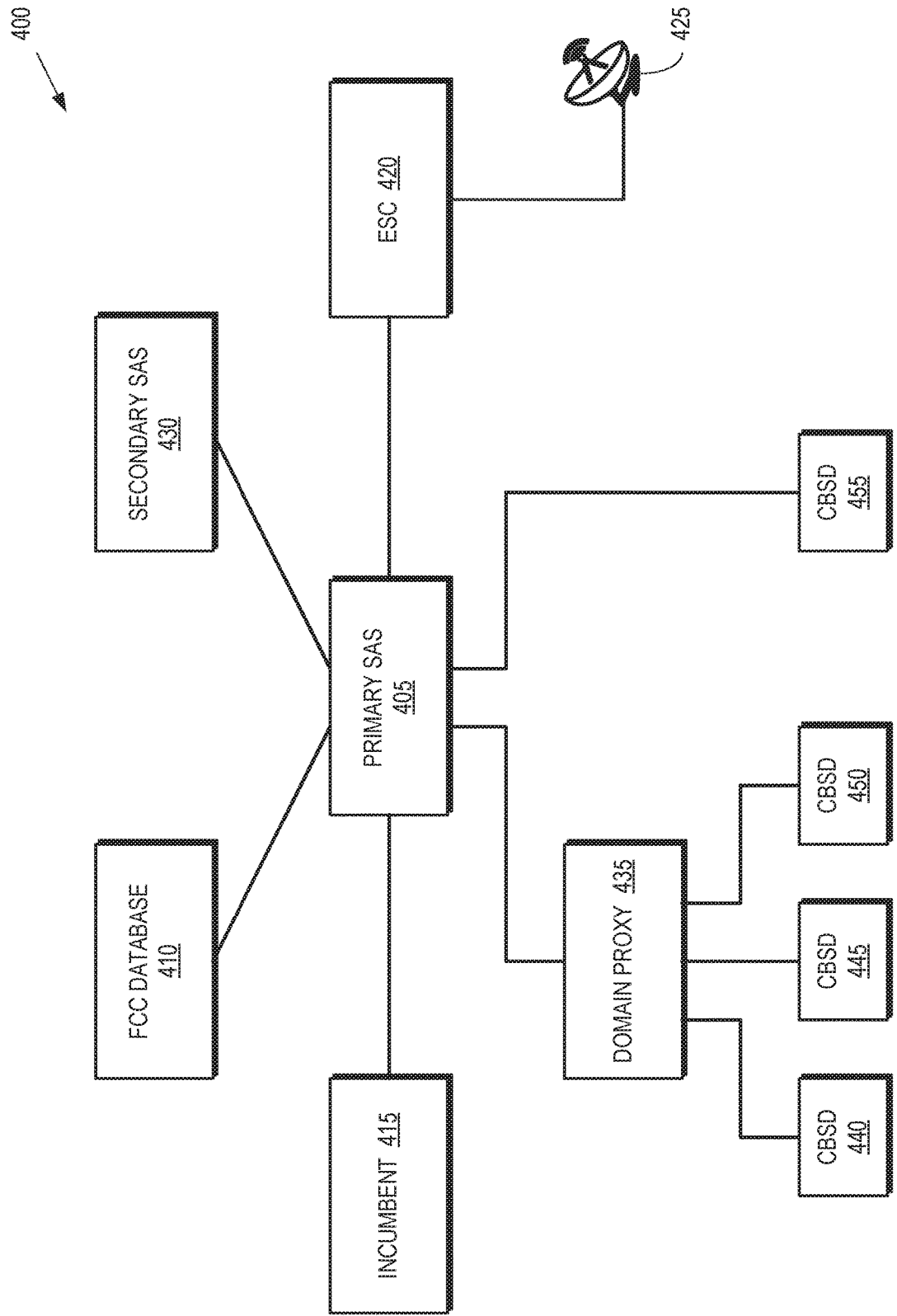
FIG. 4 is a block diagram of a communication system that implements tiered spectrum access according to some embodiments.

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area. FIG. 4 is a block diagram of a communication system 400 that implements tiered spectrum access according to some embodiments. In the illustrated embodiment, the communication system 400 implements tiered spectrum access in the 3550-3700 CBRS band via a WlnnForum architecture. The communication system 400 includes an SAS 405 that performs operations including incumbent interference determination and channel assignment, e.g., for CBRS channels shown in FIG. 3. In the illustrated embodiment, the SAS 405 is a primary SAS. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS 405. The SAS 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS 405 are connected to other SAS 430 via corresponding interfaces so that the SAS 405, 430 coordinate allocation of portions of the frequency range in geographic areas or time intervals. In the illustrated embodiment, the SAS 430 is a secondary SAS that is geo-redundant with the primary SAS 415.

A domain proxy 435 mediates communication between the SAS 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS 405. The domain proxy 435 forwards requests from the permitted CBSDs 440, 445, 450 to the SAS 405. As discussed herein, the domain proxy 435 monitors availability of the primary SAS 415 (as well as availability of one or more geo-redundant SAS) and instantiates a local SAS in response to the primary SAS 415 and any geo-redundant SASs becoming unavailable. The local SAS selectively responds to heartbeat messages from the CBSD 440, 445, 450.

In some embodiments, the domain proxy 435 aggregates the requests from the permitted CBSDs 440, 445, 450 before providing the aggregated request to the SAS 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS 405, the domain proxy 435 operates as a single entity that hides or abstracts presence of the multiple CBSDs 440, 445, 450 and conveys communications between the SAS 405 and the CBSDs 440, 445, 450. One or more CBSD 455 (only one shown in the interest of clarity) are connected directly to the SAS 405 and can therefore transmit channel access requests directly to the SAS 405. Additional discussion of this architecture is provided in Appendix B, from the Wireless Innovation Forum (WinnForum), entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
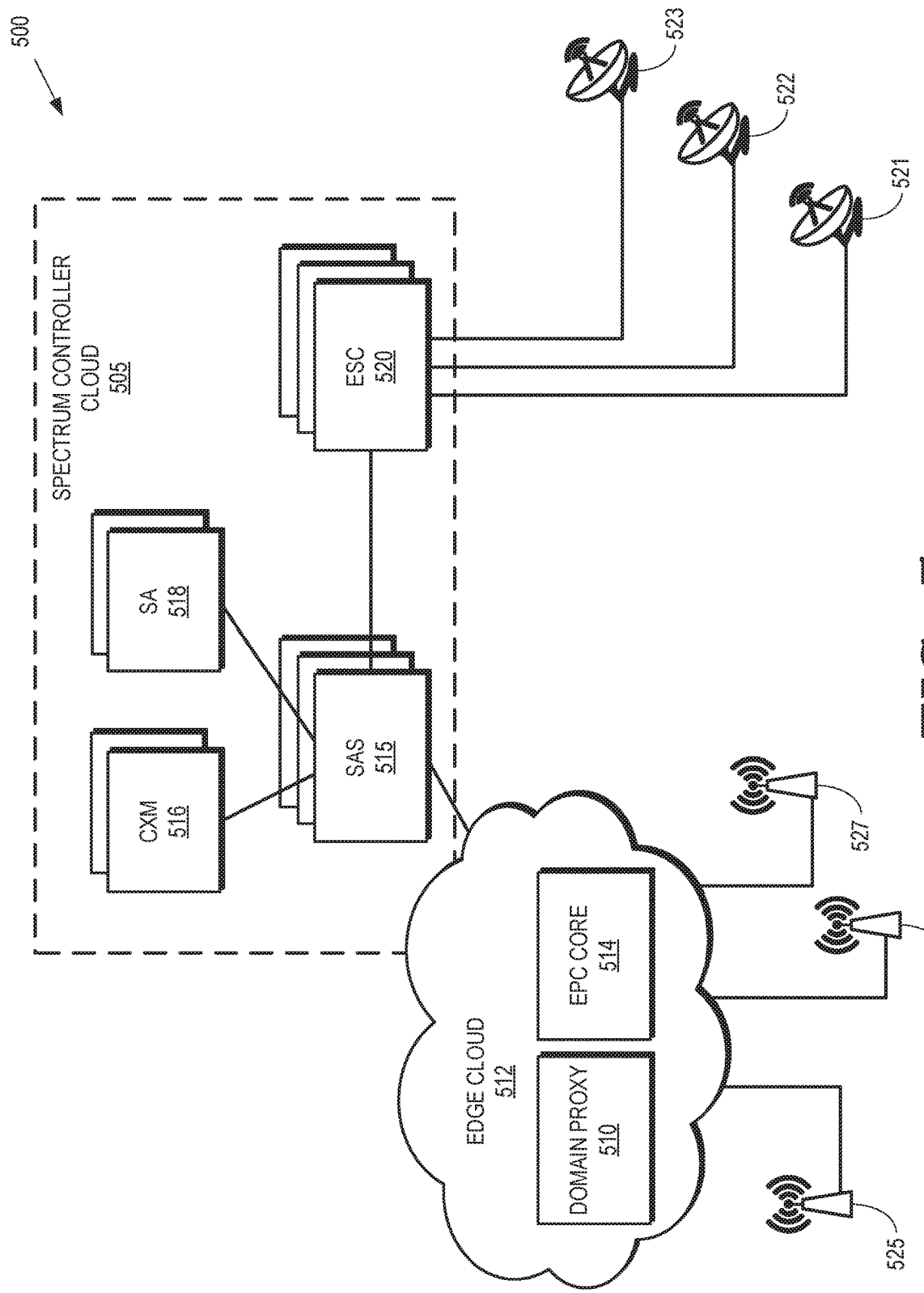
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum cloud controller 505 instantiates a domain proxy 510. In the illustrated embodiment, the domain proxy is situated on an edge cloud 512 to support mission control applications that require high network availability. In other embodiments, the domain proxy 510 is implemented at other locations in the communication system 500. For example, the domain proxy 510 can be implemented a part of a regional cloud to manage one or more different edge cloud infrastructures. The domain proxy 510 manages the edge cloud 512, which also contains a localized EPC core 514. The EPC core 514 provides functionality including LTE EPC operation support system (OSS) functionality, analytics such as traffic analytics used to determine latencies, and the like.

The spectrum controller cloud 505 instantiates multiple SAS instances 515 that support one or more private enterprise networks. Although not shown in FIG. 5, the SAS instances 515 can be connected to other SAS instances, e.g., in other clouds, via corresponding interfaces. Some embodiments of the SAS instances 515 are geo-redundant with each other. One of the SAS instances 515 can therefore be selected as a primary SAS and another one of the SAS instances 515 can be selected as a corresponding secondary SAS. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship near a port or harbor. The ESC instances 520 notify the corresponding instance of the SAS 515 in response to detecting the presence of an incumbent in a corresponding geographic area. The SAS 515 is then able to instruct non-incumbent devices that serve the geographic area to vacate portions of the spectrum overlapping with the spectrum allocated to the incumbent, e.g., by defining a DPA in terms of a frequency band in a geographic area reserved for the incumbent.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm), Category B (outdoor operation with a maximum power of 47 dBm), or CPE. However, in other embodiments, one or more of the base stations 525-527 are configured as either Category A, Category B, or CPE.

Figure 6:
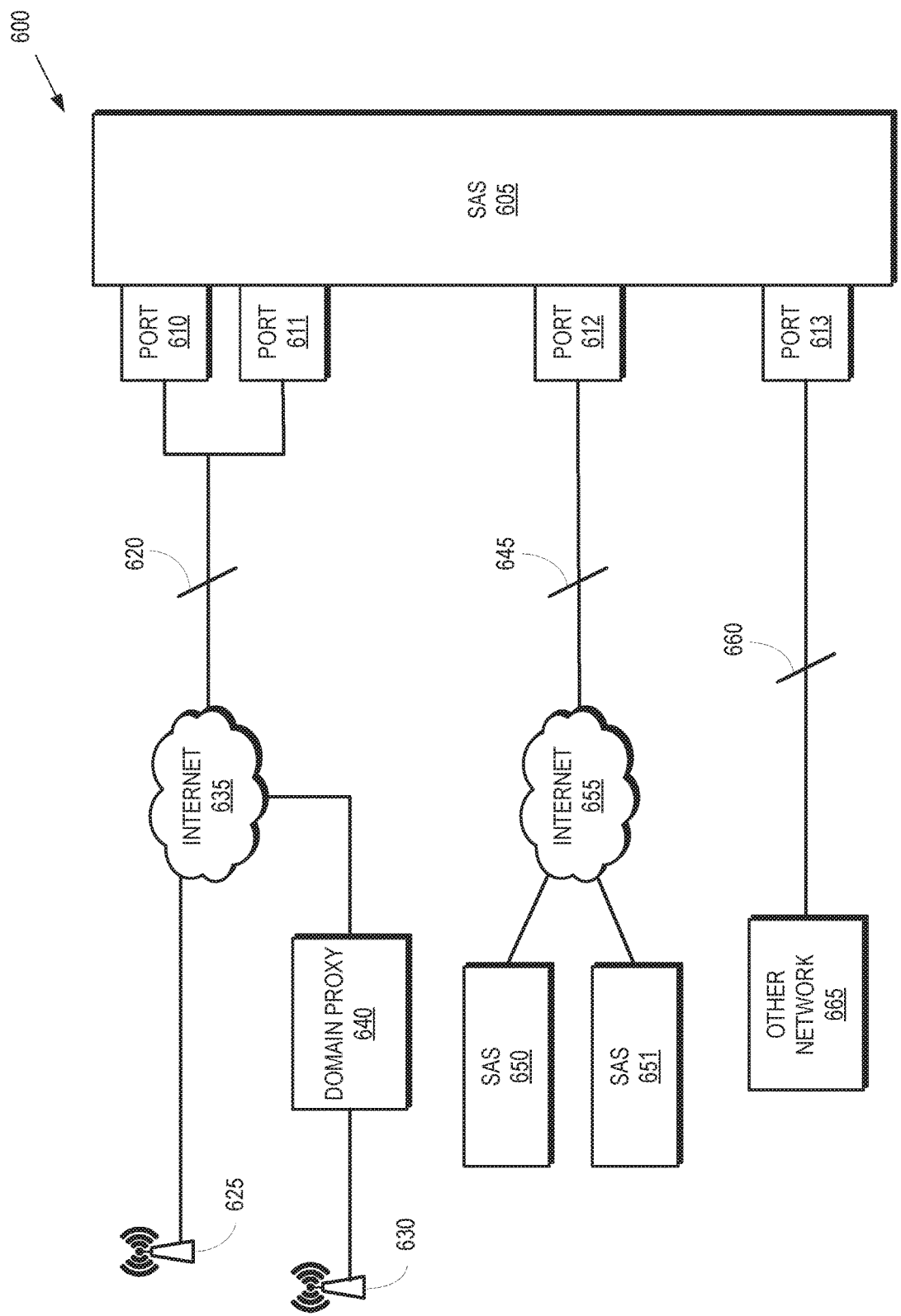
FIG. 6 is a block diagram of communication system including interfaces between CBSDs and an SAS according to some embodiments.

FIG. 6 is a block diagram of communication system 600 including interfaces between CBSDs and an SAS 605 according to some embodiments. The SAS 605 is used to implement some embodiments of the SAS 115 shown in FIG. 1, the SAS 405, 430 shown in FIG. 4, and the instances of the SAS 515 shown in FIG. 5. The SAS 605 includes ports 610, 611, 612, 613 (collectively referred to herein as "the ports 610-613") that provide access to the SAS 605. In the illustrated embodiment, the SAS 605 is selected as a primary SAS.

An interface 620 supports communication between the SAS 605 and CBSDs 625, 630 via a network such as the Internet 635 and the ports 610, 611. The CBSD 625 is connected directly to the SAS 605 via the interface 620. The CBSD 630 is connected to the SAS 605 via a domain proxy 640 that is connected to the SAS 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS 605 and one or more other SASs 650, 651 (only one shown in FIG. 6 in the interest of clarity) via a network such as the Internet 655 and the port 612. The SASs 650, 651 can be owned and operated by other providers. Some embodiments of the SASs 650, 651 are selected as secondary SAS to support the primary SAS 605. An interface 660 supports communication between the SAS 605 and one or more other networks 665 (only one shown in FIG. 6 in the interest of clarity) via the port 613.

Figure 7:
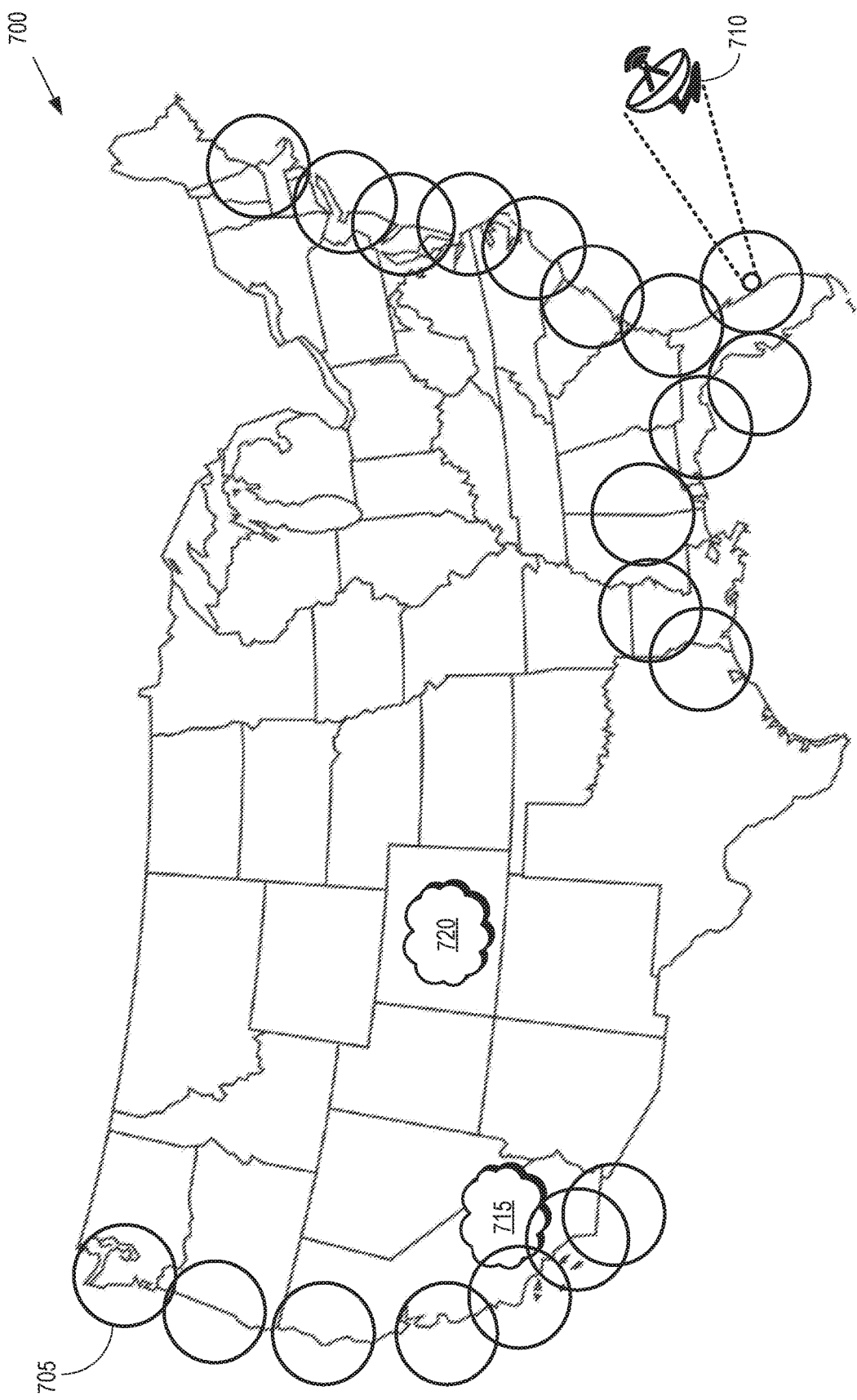
FIG. 7 is a map of the borders of the United States that illustrates a set of dynamic protection areas (DPAs) defined at different geographic locations within the United States according to some embodiments.

FIG. 7 is a map 700 of the borders of the United States that illustrates a set of dynamic protection areas (DPAs) defined at different geographic locations within the United States according to some embodiments. The DPAs 705 (only one indicated by a reference numeral in the interest of clarity) are typically, but not necessarily, defined near coastal regions to protect incumbents such as Navy ships. A DPA 705 can only be deactivated by an operational ESC sensor and consequently any communication system that uses the CBRS spectrum must include an ESC sensor, such as the ESC sensor 710, to have full access to the CBRS spectrum. The ESC sensors 710 is also required to maintain an exchange of heartbeat messages with the ESC cloud that in turn connects with one or more SAS instances to verify that the ESC sensors 710 within the DPA 705 are operational. If there are no operational ESC sensors deployed within a DPA, FCC rules require that the DPA must be activated throughout the entire 150 MHz CBRS spectrum. In this case, a DPA-enabled SAS assumes that the incumbent is present in the entire lower 100 MHz CBRS band. Based on this assumption, the DPA-enabled SAS takes into consideration the antenna height, tilt, distance from the ESC sensor and coastline of each CBSD (category A or category-B to determine if an appropriate channel grant and transmit power may be allocated for each CBSD for operation within the activated DPA.

Private enterprise networks 715, 720 are deployed to provide service in corresponding geographic areas. In the illustrated embodiment, the private enterprise network 715 is deployed approximate a coastal region and overlaps with one or more DPAs. The private enterprise network 720 is deployed at an inland location and does not overlap with the DPAs shown in FIG. 7. As discussed herein, status information is exchanged between SAS instances at a predetermined time interval, such as every 24 hours. The SAS instances generate configuration information for the CBSDs that are under their control based on the status information. The configurations are considered valid for the predetermined time interval, e.g., configurations of CBSDs in the private enterprise networks 715, 720 remain valid for 24 hours after the exchange of status information between corresponding SAS instances. However, the private enterprise network 720 does not overlap with any DPAs and therefore configuration of the CBSDs in the private enterprise network 720 can remain valid for longer than the predetermined time interval and, in some cases, remains valid indefinitely because the private enterprise network 720 is not impacted by CBSDs in other networks or by incumbents in deployed geographic vicinity.

Figure 8:
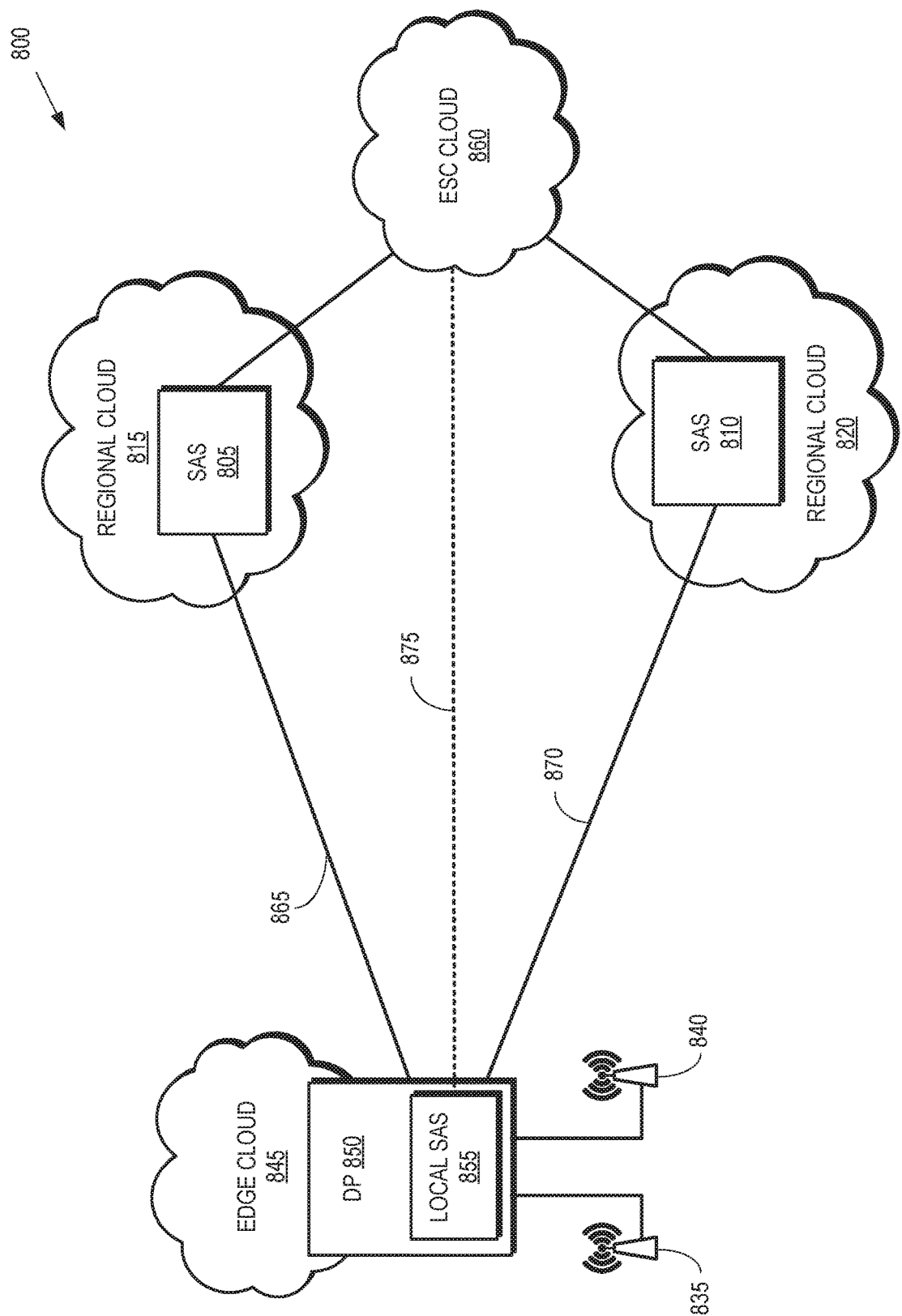
FIG. 8 is a block diagram of a communication system that implements primary and secondary SAS instances according to some embodiments.

FIG. 8 is a block diagram of a communication system 800 that implements primary and secondary SAS instances 805, 810 according to some embodiments. The primary and secondary SAS instances 805, 810 are implemented in corresponding geo-redundant regional clouds 815, 820. The primary and secondary SAS instances 805, 810 are accessed via corresponding ports using IP addresses that are broadcast or made publicly available. The visibility of the IP addresses that are used to identify the geo-redundant primary and secondary SAS instances 805, 810 makes them vulnerable to malicious attacks such as DDOS attacks, which can potentially make the geo-redundant primary and secondary SAS instances 805, 810 inaccessible, unreachable, or otherwise unavailable. The primary and secondary SAS instances 805, 810 can also become unavailable due to backhaul failures and other events.

The communication system 800 includes CBSDs such as the base stations 835, 840, which are connected to an edge cloud 845 such as the edge cloud 125 shown in FIG. 1. The base stations 835, 840 are connected to a domain proxy 850 such as the domain proxy 130 shown in FIG. 1, which aggregates traffic and instantiates a local SAS 855, as discussed herein. The local SAS 855 is not advertised over external networks and is therefore less vulnerable to attacks such as DDOS attacks. The edge cloud 845 is interconnected with the regional clouds 815, 820, e.g, using a backhaul network (not shown in FIG. 8 in the interest of clarity).

The primary and secondary SAS instances 805, 810 establish connections with an ESC cloud 860 that provides ESC services such as performing incumbent detection and notifying the primary and secondary SAS instances 805, 810 in the event that an incumbent is detected in a DPA that overlaps with the geographic areas served by the primary and secondary SAS instances 805, 810. The domain proxy 850 (or one of the base stations 835, 840) registers with one of the SAS instances 805, 810 as a primary SAS instance and uses the other one of the SAS instances 805, 810 as a geo-redundant secondary SAS instance. In the illustrated embodiment, the domain proxy 850 and the primary SAS 805 establish a connection 865 and the domain proxy establishes a connection 870 with the secondary SAS 810. The domain proxy 850 begins exchanging heartbeat messages with the primary SAS instance 805.

The domain proxy 850 is configured to monitor traffic with all available geo redundant SAS instances (including the primary SAS instance 805 and the secondary SAS instance 810) to perform a seamless switching to the secondary SAS instance 810 if the domain proxy 850 detects a break in connectivity with the primary SAS 805 due to any reason to ensure the high availability of the private enterprise network. Additionally, the domain proxy 850 switches over to the local SAS instance 855 to extend network availability, e.g., beyond the currently specified 4 minutes (240 seconds), if the edge cloud 845 loses connectivity with all geo-redundant SAS instances 805, 810. The domain proxy 850 also attempts to establish a connection 875 to the ESC cloud 860 to ensure that high availability is achieved for deployments along coast lines or other geographic areas that fall under DPA control, e.g., as shown in FIG. 7, which requires the ESC services for operations in the lower 100 MHz of the CBRS band.

Figure 9:
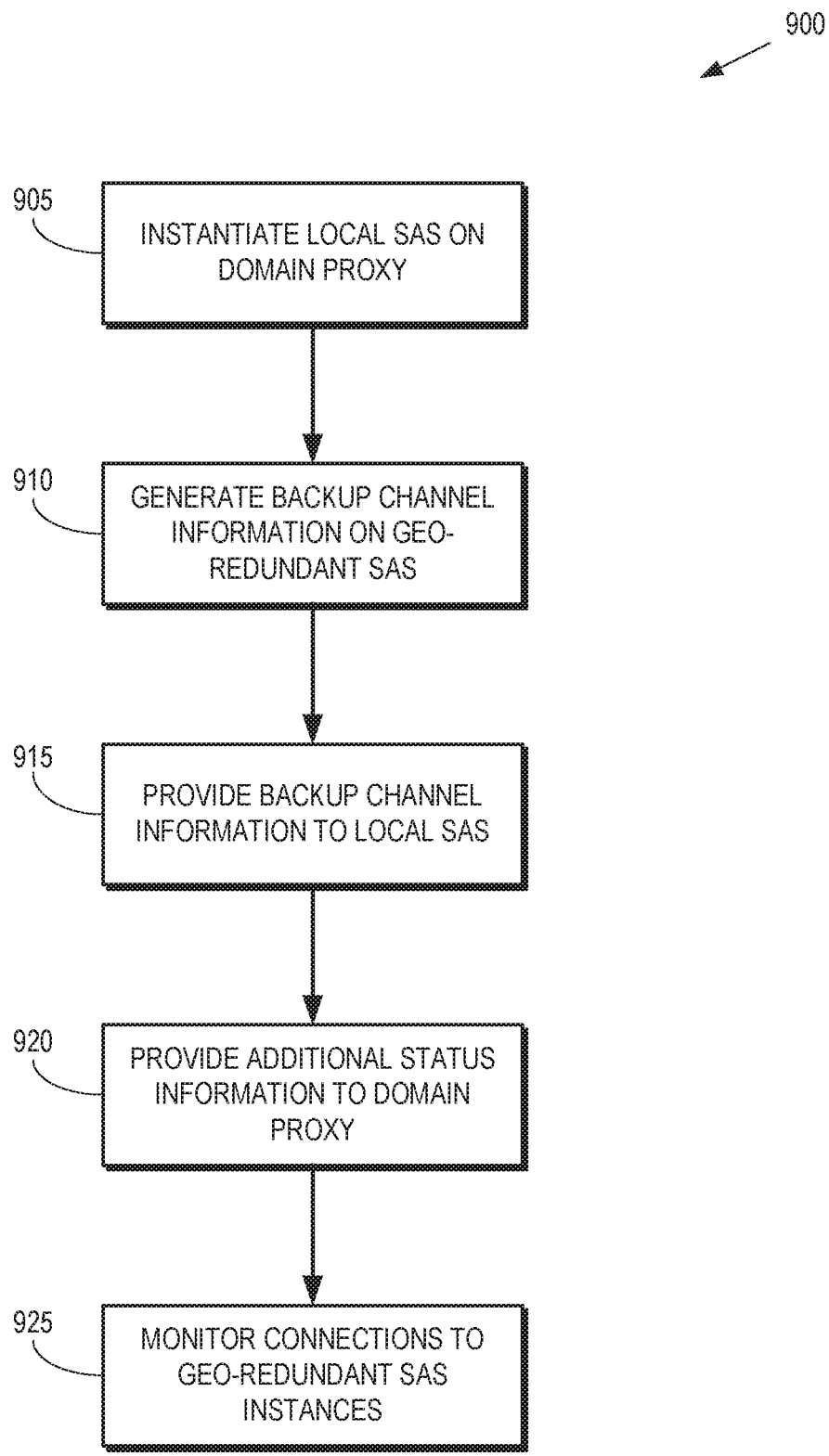
FIG. 9 is a flow diagram of a method of instantiating and configuring a local SAS instance on a domain proxy according to some embodiments.

FIG. 9 is a flow diagram of a method 900 of instantiating and configuring a local SAS instance on a domain proxy according to some embodiments. The method 900 is implemented in some embodiments of the communication system 1 shown in FIG. 1 and the communication system 8 shown in FIG. 8, as well as in other embodiments of the domain proxies discussed herein.

At block 905, the domain proxy instantiates a local SAS, which is then configured using information provided by one or more geo-redundant instances of an SAS, such as the geo-redundant SAS instances 805, 810 shown in FIG. 8. Once configured, the local SAS is able to configure the CBSDs in the edge cloud that includes the domain proxy and respond to heartbeat and other messages from the CBSDs, as discussed herein.

At block 910, one or more of the geo-redundant SAS instances generates backup channel information for the CBSDs associated with the domain proxy. In some embodiments, the geo-redundant SAS instances generate the backup channel information considering the presence of other CBSDs that are managed by SAS instances in the same geographic area that are associated with other vendors. The backup channel indicated by the backup channel information is either in the upper 50 MHz or the lower 100 MHz of the CBRS band. If the backup channel is in the lower 100 MHz within a DPA, the geo-redundant instance of the SAS selects a backup channel that is spatially separated from the originally granted channel by an amount that is determined by the characteristics of the incumbent. For example, the geo-redundant instance of the SAS can select a backup channel that is separated from the primary channel by more than 20 MHz because Naval radar systems typically impact up to 20 MHz of lower 100 MHz of the CBRS band.

At block 915, the geo-redundant instance of the SAS provides the backup channel information to the domain proxy, which stores the backup channel information in a database that indicates valid channels for use by the CBSDs in the edge cloud.

At block 920, the geo-redundant instance of the SAS provides additional status information to the domain proxy. In some embodiments, the status information includes status information that is acquired during exchanges with other SAS instances, e.g., via a mesh network. The exchanges are performed at predetermined time intervals such as once every 24 hours. The status information includes credentials that the local SAS uses to establish a connection with an ESC cloud, information identifying DPAs that overlap in frequency or geographic area with the frequencies or geographic areas associated with the edge cloud, presence information indicating whether an incumbent is present in one of the DPAs, status information for other CBSDs that are proximate the CBSDs in the edge cloud, channel and power assignments for the CBSDs that are determined based on the status information, and the like.

At block 925, the domain proxy begins monitoring connections to the geo-redundant instances of the SAS to determine whether the instances are available or reachable. As discussed herein, the domain proxy switches over to the local SAS in response to the geo-redundant instances of the SAS becoming unavailable or unreachable.

Figure 10:
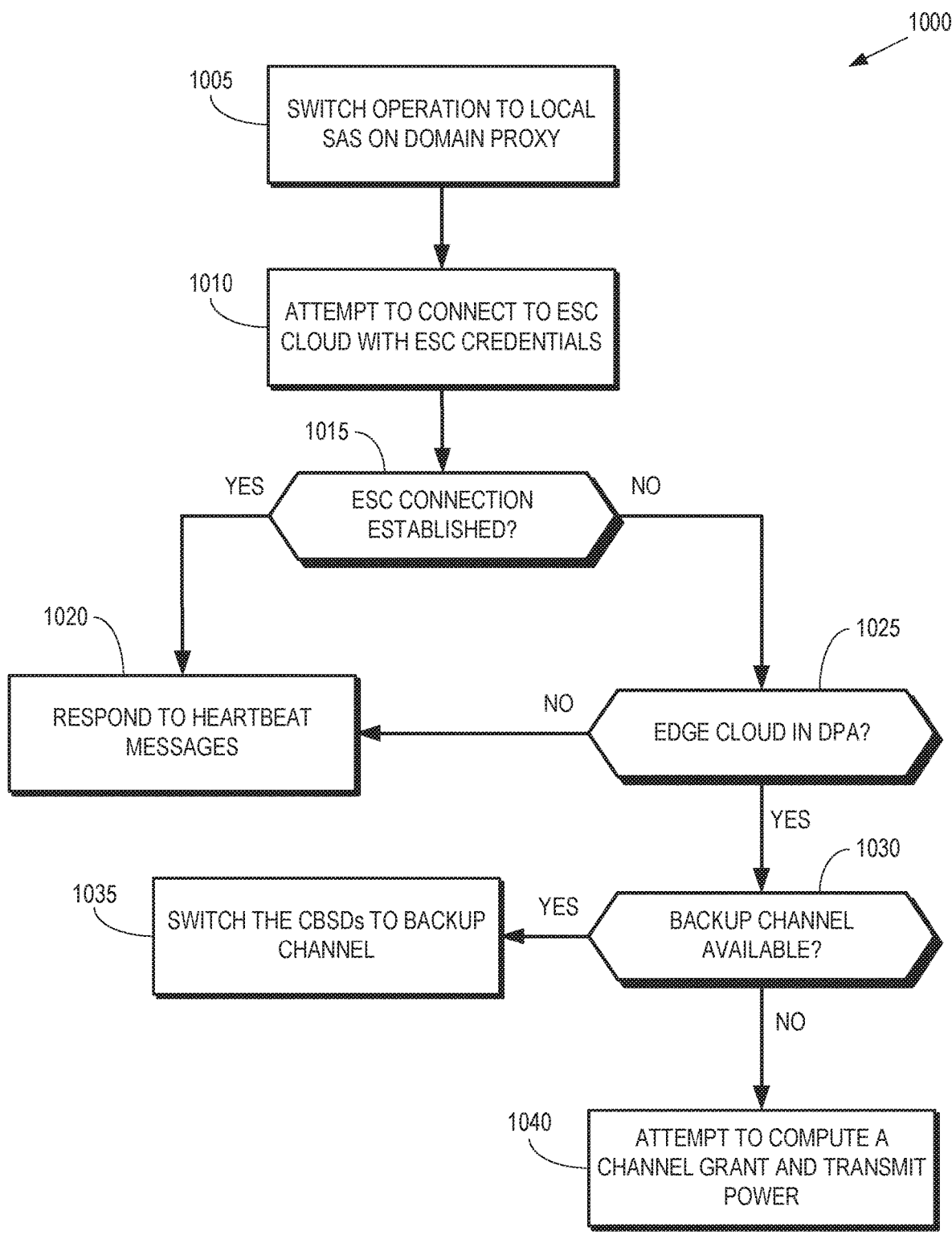
FIG. 10 is a flow diagram of a method of operating a local SAS implemented in a domain proxy according to some embodiments.

FIG. 10 is a flow diagram of a method 1000 of operating a local SAS implemented in a domain proxy according to some embodiments. The method 1000 is implemented in some embodiments of the communication system 1 shown in FIG. 1 and the communication system 8 shown in FIG. 8, as well as in other embodiments of the domain proxies discussed herein. Domain proxies perform embodiments of the method 1000 in response to the domain proxy determining that the geo-redundant instances of the SAS that support the domain proxy are unavailable or unreachable.

At block 1005, the domain proxy switches over from the geo-redundant instances of the SAS to the local SAS implemented in the domain proxy. As discussed herein, the domain proxy switches to the local SAS in response to determining that the geo-redundant instances of the SAS are unavailable or unreachable.

At block 1010, the local SAS attempts to establish a connection with an ESC cloud using credentials that were previously supplied by one of the geo-redundant instances of the SAS. The local SAS systems to establish the connection in case the edge cloud that hosts the domain proxy is located in or overlaps with a DPA. If the local SAS successfully establishes the connection, the ESC cloud provides information indicating frequency bands, geographic areas, and presence information for incumbents associated with the DPA.

At decision block 1015, the local SAS determines whether the connection was successfully established. If so, the method 1000 flows to block 1020. If the local SAS failed to establish the connection with the ESC cloud, the method 1000 flows to decision block 1025.

At block 1020, the local SAS responds to heartbeat and other messages received from CBSDs in the edge cloud associated with the domain proxy. In some embodiments, the local SAS continues to send authorization OK responses to heartbeat requests from the CBSDs that are under its control on the edge cloud network. If a CBSD sends a spectrum inquiry message, the local SAS responds by sending a response to indicate the valid channels available to the CBSD, e.g., as a valid channel set. If a CBSD sends a grant request for a channel in the valid channel set, the local SAS responds by sending a message that grants the channel to the CBSD. If the channel is not in the valid channel set, the local SAS responds by sending a message that denies the CBSD access to the channel.

At decision block 1025, the local SAS determines whether the edge cloud is located in, or overlapping with, a DPA. In some embodiments, the local SAS determines whether the edge cloud is in, or overlapping with, the DPA based on information that was provided to the local SAS by a geo-redundant instance of the SAS prior to the geo-redundant instance of the SAS becoming unavailable or unreachable. If the edge cloud is not located in or overlapping with the DPA, the method 1000 flows to block 1020. Otherwise, the method flows to decision block 1030.

At decision block 1030, the local SAS determines whether a backup channel in the upper 50 MHz of the CBRS band is available while it is unable to establish connectivity with the ESC cloud. For example, the geo-redundant instances of the SAS may have provided a backup channel in the upper 50 MHz of the CBRS band for use by the CBSDs, as discussed herein. If a backup channel is available, the method 1000 flows to block 1035 and the local SAS instructs the CBSDs to switch to the backup channel. If no backup channel is available, the method 1000 flows to block 1040.

At block 1040, the local SAS that is also a DPA-enabled SAS assumes that the incumbent is present in the entire lower 100 MHz of the CBRS band and attempts to compute a channel grant and transmit power for each CBSD based on its type (Category A o category-B), antenna height, tile, distance from ESC sensor, and coastline. If the DPA-enabled SAS is successful in finding an appropriate channel grant and transmit power to safely operate the CBSD in the DPA while it is not connected to the ESC cloud, it will relay that to the CBSDs in an attempt to keep the private enterprise network operational even after losing connectivity with the regional SAS for a time period that exceed 4 minutes (240 seconds).

Figure 11:
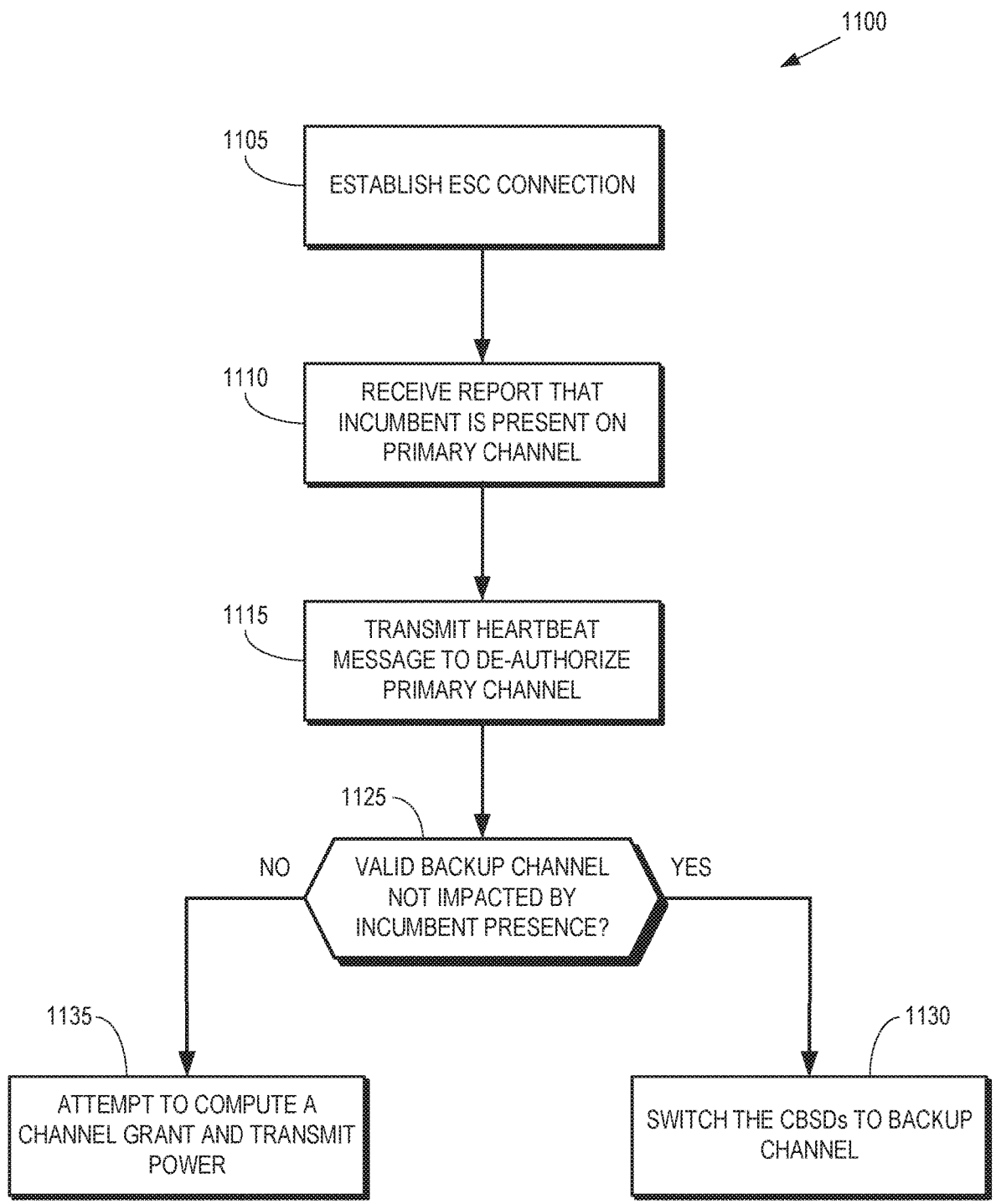
FIG. 11 is a flow diagram of a method 1100 of authorizing a backup channel in response to an incumbent being present in a DPA associated with a domain proxy that implements a local SAS according to some embodiments.

FIG. 11 is a flow diagram of a method 1100 of authorizing a backup channel in response to an incumbent being present in a DPA associated with a domain proxy that implements a local SAS according to some embodiments. The method 1100 is implemented in some embodiments of the communication system 1 shown in FIG. 1 and the communication system 8 shown in FIG. 8, as well as in other embodiments of the domain proxies discussed herein. Domain proxies perform embodiments of the method 1100 in response to the domain proxy determining that the geo-redundant instances of the SAS that support the domain proxy are unavailable or unreachable.

At block 1105, the local SAS successfully establishes a connection with an ESC cloud using credentials provided by a (currently unavailable or unreachable) geo-redundant instance of an SAS.

At block 1110, the local SAS receives a report from the ESC cloud indicating that an incumbent is present in a DPA that overlaps with the edge cloud. The local SAS determines that the CBSDs served by the local SAS are operating on a primary channel that overlaps with the channels defined by the DPA. For example, the local SAS determines that the primary channel granted to the CBSDs is impacted by the presence of the incumbent.

At block 1115, the local SAS transmits a heartbeat response message to de-authorize the channel grant that was provided to CBSDs for the primary channel and forces or instructs the CBSDs to go to a backup channel for operation.

At decision block 1125, the local SAS determines whether the backup channel is a valid channel for use by the CBSDs. In some embodiments, the local SAS previously stored information indicating valid backup channels that were identified by the geo-redundant instances of the SAS and provided to the local SAS. If the backup channel is valid and is not impacted by the incumbent presence, the method 1100 flows to block 1130 and the local SAS transmits a heartbeat response authorizing the backup channel for use by the CBSDs. If the backup channel is not available or is in the lower 100 MHz of the CBRS band, and is also impacted by the incumbent presence, the method 1100 flows to block 1135.

At block 1135, the local SAS that is also DPA enabled SAS assumes that the incumbent is present in the entire lower 100 MHz of the CBRS band and attempts to compute a channel grant and transmit power for each CBSDs based on its type (Category A or category-B), antenna height, tile, distance from ESC sensor, and proximity to a coastline. If the DPA-enabled SAS is successful in finding an appropriate channel grant and transmit power to safely operate the CBSD in the DPA while it is not connected to the ESC cloud, the DPA-enabled SAS relays this information to the CBSDs in an attempt to keep the private enterprise network operational even after losing connectivity with the regional SAS for a time period that exceed 4 minutes (240 seconds).

Some embodiments of the local SAS operate in a hold-over mode for a predetermined time interval, such as 24 hours, which is determined by a time interval between SAS-SAS message exchanges that are used to exchange status information. For example, all SASs download data from the FCC, WINNFORUM databases, and peer SASs every 24-hrs. The message exchange allows the SAS instances to acquire and distribute CBSD data for newly registered CBSDs and remove data associated with de-registered CBSDs. The message exchange also distributes data for new incumbents and static incumbents such as FSS, GW, new portal DPAs and the like. In some embodiments, instances of the SAS from all vendors are connected in a mesh configuration and the SAS instances exchange the status information for their CBSDs via SAS-to-SAS interfaces. However, the local SAS instantiated by the domain proxy on the edge cloud is not connected to other vendor's instances of the SAS.

Regional instances of the SAS operated by different vendors perform Coordinated Periodic Activities Among SASs (CPAS) every 24-hrs by exchanging status information for the CBSDs they are managing. The instances of the SAS use the exchanged status information to compute or update channel and power assignments for the CBSDs based on the new snapshot of the CBSDs managed by all SAS instances from all SAS administrators. Accounting to the properties of the different CBSDs allows each instance of the SAS to appropriately protect the incumbents via accurate interference calculations that are performed based on status information for all the CBSDs deployed in the geographic area. If the CBSDs in an edge cloud network fall within a DPA, the instances of the SAS compute backup channel grant list for the CBSDs in addition to the primary channel grant. As discussed herein, information indicating the backup channel grant list is relayed to the local SAS instantiated by the domain proxy on the edge cloud. The local SAS stores the backup channel grant in case the incumbent appears when the regional instances of the SAS are inaccessible and the primary channel grant is impacted by the incumbent presence in the lower 100 MHz.

The regional instances of the SAS also relay login credentials to the domain proxy in the edge cloud if the edge cloud falls within a DPA. As discussed herein, the login credentials are used to establish connectivity with the ESC cloud so that the local SAS can receive service for an ESC region if the domain proxy loses connectivity with all the regional instances of the SAS. The local SAS on the domain proxy uses the incumbent and backup channel grant information to authorize or deny requests from CBSDs in heartbeat REQ-RESP. The local SAS also allows the CBSDs to stay on air even when connection to the regional, geo-redundant instances of the SAS is broken and if an incumbent were to appear and impact the current channel grant.

Results obtained from CPAS are valid for a predetermined time interval such as 24-hrs. By computing all possible (primary and backup channel grants) for CBSDs in a given edge cloud network, and relaying the channel grant list to the local SAS on the domain proxy, embodiments of the techniques disclosed herein ensure that the local SAS instance on the domain proxy on the edge cloud has access to the information needed to keep the network operational for up to 24 hours (and not just for 4 minutes as per the CBRS rule) if connectivity with all the geo-redundant instances of the SAS on the regional cloud is lost. The local SAS also uses the status information to move the CBSDs that are operating in the lower 100 MHz to the free 3650-3700 slots in the event that both the geo-redundant instances of the SAS and the ESC network are offline. In some embodiments, the status information stored at the local SAS does not change significantly, which allows the local SAS to continue to respond to heartbeat messages from the CBSDs and keep the CBSDs online for time intervals longer than 24 hours and, in some cases, indefinitely.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
(a) hardware-only circuit implementations (such as implementations and only analog and/or digital circuitry) and
(b) combinations of hardware circuits and software, such as (as applicable):
  (i) a combination of analog and/or digital hardware circuit(s) with software/firmware and
  (ii) any portions of a hardware processor(s) with software (including digital signal processor(s), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
at least one processor; and
at least one memory including instructions which, when executed by the at least one processor, cause the apparatus at least to:
  aggregate, at a domain proxy, traffic for Citizens Broadband radio Service Devices (CBSDs) in a private enterprise network;
  instantiate, at the domain proxy, a local spectrum access system (SAS);
  monitor, at the domain proxy, communication with geo-redundant instances of the SAS that allocate frequency bands in a shared spectrum to the CBSDs;
  switch over, at the domain proxy, from the geo-redundant instances of the SAS to the local SAS in response to the geo-redundant instances of the SAS becoming unavailable; and
  respond, from the local SAS, to heartbeat messages from the CBSDs.

2. The apparatus of claim 1, wherein the instructions, when executed by the at least one processor, cause the apparatus to:
provide, by the local SAS, information indicating valid channels in response to spectrum inquiry messages received from the CBSDs; and
approve, by the local SAS, grant requests from the CBSDs for channels in a valid channel set.

3. The apparatus of claim 1, wherein the instructions, when executed by the at least one processor, cause the apparatus to:

attempt to establish a connection between the local SAS and an environmental sensing capability (ESC) in response to the geo-redundant instances of the SAS becoming unavailable.

4. The apparatus of claim 3, wherein the instructions, when executed by the at least one processor, cause the apparatus to:
determine, at the local SAS, whether the connection with the ESC has been established and whether a first geographic area and a first channel in the shared spectrum served by the CBSDs overlaps with a dynamic protection area (DPA) defined by a second geographic area and a portion of the shared spectrum allocated to an incumbent.

5. The apparatus of claim 4, wherein the instructions, when executed by the at least one processor, cause the apparatus to:
instruct, at the local SAS, the CBSDs to switch to a second channel if the connection was not established with the ESC and if the first geographic area and the first channel overlap with the DPA.

6. The apparatus of claim 5, wherein the second channel is computed by at least one of the geo-redundant instances of the SAS based on presence information for the CBSDs and other CBSDs that are managed by other SAS vendors proximate the first geographic area.

7. The apparatus of claim 5, wherein the second channel is spatially separated from the first channel by a frequency determined based on properties of the incumbent.

8. The apparatus of claim 4, wherein the instructions, when executed by the at least one processor, cause the apparatus to:
transmit, from the local SAS, a heartbeat response to the CBSDs that de-authorizes a grant of the first channel in response to determining that the connection with the ESC was established and in response to the ESC reporting presence of the incumbent on the first channel.

9. The apparatus of claim 8, wherein the instructions, when executed by the at least one processor, cause the apparatus to:
grant, at the local SAS, the CBSDs access to a second channel in response to receiving a message indicating the second channel following transmission of the heartbeat message that de-authorizes the grant of the first channel and in response to the second channel being previously provided to the local SAS by at least one of the geo-redundant instances of the SAS.

10. The apparatus of claim 3, wherein the instructions, when executed by the at least one processor, cause the apparatus to:
respond, from the local SAS, to the heartbeat messages from the CBSDs for a time interval that is determined based on a predetermined time interval for exchanging status information between peer instances of the SAS.

11. The apparatus of claim 10, wherein the geo-redundant instances of the SAS determine channel and power assignments for the CBSDs based on the status information, and wherein the channel and power assignments are valid for the predetermined time interval.

12. The apparatus of claim 11, wherein the instructions, when executed by the at least one processor, cause the apparatus to:
receive, at the local SAS, the status information from at least one of the geo-redundant instances of the SAS and
receive, at the local SAS, information indicating a second channel and login credentials for the ESC.

13. A method comprising:
aggregating, at a domain proxy, traffic for Citizens Broadband radio Service Devices (CBSDs) in a private enterprise network;
instantiating, at the domain proxy, a local spectrum access system (SAS);
monitoring, at the domain proxy, communication with geo-redundant instances of the SAS that allocate frequency bands in a shared spectrum to the CBSDs;
switching over, at the domain proxy, from the geo-redundant instances of the SAS to the local SAS in response to the geo-redundant instances of the SAS becoming unavailable; and
responding, from the local SAS, to heartbeat messages from the CBSDs.

14. The method of claim 13, further comprising:
attempting to establish a connection between the local SAS and an environmental sensing capability (ESC) in response to the geo-redundant SASs instances of the SAS becoming unavailable.

15. The method of claim 14, further comprising:
determining, at the local SAS, whether the connection with the ESC has been established and whether a first geographic area and a first channel in the shared spectrum served by the CBSDs overlaps with a dynamic protection area (DPA) defined by a second geographic area and a portion of the shared spectrum allocated to an incumbent.

16. The method of claim 15, further comprising:
instructing, at the local SAS, the CBSDs to switch to a second channel if the connection was not established with the ESC and if the first geographic area and the first channel overlap with the DPA;
wherein the second channel is computed by at least one of the geo-redundant instances of the SAS based on presence information for the CBSDs and other CBSDs that are managed by other SAS vendors proximate the first geographic area;
wherein the second channel is spatially separated from the first channel by a frequency determined based on properties of the incumbent.

17. The method of claim 15, further comprising:
transmitting, from the local SAS, a heartbeat response to the CBSDs that de-authorizes a grant of the first channel in response to determining that the connection with the ESC was established and in response to the ESC reporting presence of an incumbent on the first channel.

18. The method of claim 17, further comprising:
granting, at the local SAS, the CBSDs access to a second channel in response to receiving a message indicating the second channel following transmission of the heartbeat message that de-authorizes the grant of the first channel and in response to the second channel being previously provided to the local SAS by at least one of the geo-redundant instances of the SAS.

19. The method of claim 15, further comprising:
responding, from the local SAS, to the heartbeat messages from the CBSDs for a time interval that is determined based on a predetermined time interval for exchanging status information between peer instances of the SAS;
receiving, at the local SAS, the status information from at least one of the geo-redundant instances of the SAS; and
receiving, at the local SAS, information indicating a second channel and login credentials for the ESC.

20. A domain proxy, comprising:
at least one processor; and
at least one memory including instructions which, when executed by the at least one processor, cause the domain proxy at least to perform:
- aggregating traffic for Citizens Broadband radio Service Devices (CBSDs) in a private enterprise network;
- instantiating, at the domain proxy, a local spectrum access system (SAS);
- monitoring communication with geo-redundant instances of the SAS that allocate frequency bands in a shared spectrum to the CBSDs;
- switching over from the geo-redundant instances of the SAS to the local SAS in response to the geo-redundant instances of the SAS becoming unavailable; and
- responding, from the local SAS, to heartbeat messages from the CBSDs.

* * * * *